United States Patent [19]

Bromley

[11] 4,249,734
[45] Feb. 10, 1981

[54] HAND-HELD TWO-PLAYER ELECTRONIC FOOTBALL GAME

[75] Inventor: Eric Bromley, West Simsbury, Conn.

[73] Assignee: Coleco Industries, Inc., Hartford, Conn.

[21] Appl. No.: 15,129

[22] Filed: Feb. 26, 1979

[51] Int. Cl.³ ............................................... A63F 9/00
[52] U.S. Cl. .................................. 273/94; 273/85 G
[58] Field of Search ............... 273/85 G, 86 R, 86 B, 273/88, 94, DIG. 28, 1 E; 364/410

[56] References Cited

U.S. PATENT DOCUMENTS

| | | | |
|---|---|---|---|
| 2,843,381 | 7/1958 | Davis | 273/1 E |
| 2,883,193 | 4/1959 | Iannone | 273/88 |
| 3,337,218 | 8/1967 | Hurley | 273/85 G |
| 3,413,002 | 11/1968 | Welch | 273/93 |
| 3,556,525 | 1/1971 | Pegg | 273/94 |
| 3,583,538 | 6/1971 | Hurley | 273/85 G |
| 3,606,329 | 9/1971 | Wilson | 273/88 |
| 3,630,522 | 12/1971 | Bear | 273/94 |
| 3,790,170 | 2/1974 | Alexander | 273/88 |
| 3,874,669 | 4/1975 | Ariano et al. | 273/85 G |
| 4,017,075 | 4/1977 | Wilson | 273/94 |
| 4,026,555 | 5/1977 | Kirschner et al. | 273/85 G |
| 4,053,740 | 10/1977 | Rosenthal | 273/85 G |
| 4,089,524 | 5/1978 | Hauck | 273/85 G |
| 4,093,223 | 6/1978 | Wilke | 273/85 G |
| 4,116,441 | 9/1978 | Runte et al. | 273/85 G |
| 4,162,792 | 7/1979 | Chang et al. | 273/85 G |

FOREIGN PATENT DOCUMENTS

| | | | |
|---|---|---|---|
| 2617147 | 10/1977 | Fed. Rep. of Germany | 273/DIG. 28 |
| 2807231 | 8/1978 | Fed. Rep. of Germany | 273/DIG. 28 |
| 2826731 | 12/1978 | Fed. Rep. of Germany | 273/DIG. 28 |
| 50-4737274 | 11/1975 | Japan | 273/DIG. 28 |

OTHER PUBLICATIONS

Electronic Design, May 10, 1977, p. 21.
Funkschall, Jul. 4, 1975, pp. 91–94.
Mattel Electronics ™ Football Game Instructions, 1977, pp. 1–5.

*Primary Examiner*—Vance Y. Hum

[57] ABSTRACT

A hand-held electronic device for simulating the game of football includes control buttons that provide opposing control units, one for an offensive operator and the other for a defensive operator. A display panel is mounted in the housing of the device, inside which an operational circuit is contained that receives signals from the control units mounted in the housing. The operational circuit causes a multiplicity of offensive and defensive symbols to be displayed on the display panel, and coincidence is detected between various of the players to detect simulated blocks, tackles, pass completions, and interceptions. In one mode the defensive players are all controlled by the operational circuit in a pseudo-random manner, while in another mode one of the defensive players is controlled from the control board.

11 Claims, 18 Drawing Figures

HAND-HELD TWO-PLAYER ELECTRONIC FOOTBALL GAME

BACKGROUND OF THE INVENTION

The present invention relates to the field of electronic hand-held football games. In co-pending Application Ser. No. 919,860 on an invention by the same inventor, a hand-held football game is described in which a multiplicity of defensive-player symbols enable blocking and passing to be simulated. In that game the operator manipulates buttons to control either all the players in tandem or one simulated receiver. Blocking, passing, kicking, and tackling are all simulated by this device, a simple hand-held electronic game.

It is an object of the present invention to provide similar features but permit simultaneous operation by two opposing operators. It is also an object of the present invention to allow different tactics to be employed by permitting the simulation of running and passing in the same play.

SUMMARY OF THE INVENTION

The foregoing and related objects are achieved in a novel apparatus for simulating a sports-action team game. The apparatus includes a, hand-holdable housing having two end portions and an intermediate portion with a display panel on the upper surface of the intermediate portion and including a visual simulation of a playing field which is adapted to display symbols in response to electrical signals applied to it. Operational-circuit means in the housing are operatively connected to the display panel for generation and transmission of electrical signals to it to produce symbols on the simulated playing field. The symbols simulate to multiplicity of offensive players and a multiplicity of defensive players, one of the player symbols at a time simulating a ball carrier.

The operational-circuit means includes means for moving a multiplicity of the offensive-player symbols in a controlled manner along the playing field. It also has means for moving at least some of the defensive-player symbols along the playing field in a variable manner and at least a controllable one of the defensive-player symbols along the playing field in a controlled manner. Means are included in the operational-circuit means for detecting the independent coincidence of a multiplicity of offensive-player symbols with a multiplicity of defensive-player symbols and terminating play action upon detection of a coincidence of the ball-carrier symbol with a defensive-player symbol. Finally, the operational-circuit means provides means for monitoring play action to record information concerning the status of the simulated game and for producing signals indicative of the status information. The signals are transmitted to the display panel to display the status information on it.

A multiplicity of manually operable control elements in the apparatus provides offensive and defensive control units at least in the two end portions thereof. The control elements are connected to the operational-circuit means for transmission of signals to the operational-circuit means through operation of the control elements. The offensive-movement means are arranged to produce movement of at least one of the offensive-player symbols in response to signals transmitted from the offensive-unit control elements, and the defensive-movement means are arranged to produce movement of the controllable defensive-player symbol in response to signals transmitted from the defensive-unit control elements. The control elements include means for disabling the defensive control unit to permit one player operation of the apparatus and the operational circuit means includes means for assuming the internal operation of the defensive movement means to effect only variable movement of the defensive-player symbols.

The coincidence-detection means can include means for suppressing, upon detection of a coincidence between a defensive-player symbol and an offensive-player symbol other than the ball-carrier symbol, display of the coincident defensive-player sumbol until termination of play action. It can also include means for suppressing, upon detection of a coincidence between a defensive-player symbol and an offensive-player symbol other than the ball-carrier symbol, display of the coincident offensive-player symbol until termination of play action.

In the preferred embodiment, the operational-circuit means transmits signals to the display panel to produce a symbol simulating a ball. It includes means for moving the ball symbol in a path beginning at the position of the ball-carrier symbol, thereby simulating a pass. The offensive-movement means has means for moving at least one of the offensive-player symbols, denominated a receiver symbol, independently of the ball-carrier symbol in response to signals from the control board, and the operational-circuit means includes means for detecting coincidence between the ball symbol and the receiver symbol and for thereby detecting a simulated pass completion. The coincident receiver symbol is replaced by the ball-carrier symbol between coincidence and termination of play action. It is also desirable for the operational-circuit means to have means for detecting coincidence between the ball symbol and at least one of the defensive-player symbols, thereby detecting a simulated interception, and for indicating the interception. The ball-carrier symbol differs from the rest of the offensive-player symbols in the preferred embodiment, and a pass completion is thereby indicated by replacement of the coincident-receiver symbol with the ball-carrier symbol. In such a device the defensive-movement means may prevent the defensive-player symbols from moving to coincide with the receiver symbols, and the receiver-movement means may prevent the receiver symbols from moving into coincidence with the defender symbols. The defensive-movement means can move some of the defensive-player symbols in a variable manner toward the receiver symbols to provide further realism. A further feature of the preferred embodiment is that the orientations of the player symbol with respect to each other at the beginning of play action is dependent upon signals transmitted from the control board.

Preferably, the operational-circuit means further includes means for detecting coincidence between the ball symbol and the controllable defensive-player symbol, thereby detecting a simulated interception, and for indicating the interception.

An increased measure of versatility is afforded if the offensive-movement means is operable alternately to move a multiplicity of the offensive-player symbols simultaneously and to move the receiver symbol independently of the ball-carrier symbol without an intervening termination of play action.

In the preferred embodiment, the defensive-movement means moves at least some of the defensive-player symbols according to moves selected from repertoires of possible means associated with the defensive-player symbols, and the defensive-player symbols are divided into groups, each group having a different repertoire of possible moves. At least one of the groups has a repertoire that depends on the position on the display panel of at least one of the offensive-player symbols.

The defensive-movement means in the embodiment illustrated below includes means operable by operation of at least one of the manually operable control elements to defeat the response of the movement of the controllable defensive player to signals from the defensive-unit control elements.

There is also taught in the description below a method of playing a simulated sports-action team game that includes providing a, hand-holdable housing including the display panel mentioned above and generating and transmitting electrical signals to it to produce a multiplicity of offensive-player symbols, one of them at a time simulating a ball carrier, and to move a multiplicity of those symbols in a controlled manner along the simulated playing field in response to manipulation of the control elements of the offensive control unit. Signals are generated and transmitted to the display panel to produce a multiplicity of defensive-player symbols on the display panel and move at least some of them along the simulated playing field. The movement of at least a controlled one of the defensive-player symbols is in a controlled manner in response to manipulation of the control elements of the defensive control unit. The method further includes detecting the independent coincidence of a multiplicity of offensive-player symbols with a multiplicity of defensive-player symbols, terminating play action upon detection of coincidence between the ball-carrier symbol and a defensive-player symbol, and monitoring play action to record information concerning the status of the simulated game.

The method may additionally include the step of operating one of the manually operable control elements to disable the manually operable defensive player control elements to permit one player operation of the game and to activate means for assuming the internal operation of the defensive-player symbols so as to effect only variable movement of the defensive-player symbols.

The step of moving the offensive-player symbols preferably includes moving at least one of the offensive-player symbols, denominated a receiver symbol, independently of the ball-carrier symbol. The method would then also include the steps of generating and transmitting electrical signals to the display panel to produce a ball symbol on the display panel and to move the ball symbol along the simulated playing field from the ball-carrier symbol toward the receiver symbol, thereby simulating a pass, and detecting coincidence between the ball symbol and the receiver symbol, thereby detecting the occurrence of a simulated pass completion.

The method may further include the steps of detecting coincidence between the ball symbol and the controllable defensive-player symbol, thereby detecting a simulated interception, and indicating the interception.

It is a desirable feature of this method that the controllable defensive-player symbol be distinct in appearance from the rest of the defensive-player symbols.

BRIEF DESCRIPTION OF THE DRAWINGS

These and further features and advantages of the present invention can be appreciated by reference to the attached drawings, in which.

DETAILED DESCRIPTION OF THE PREFERRED EMBODIMENT

Figure 1:
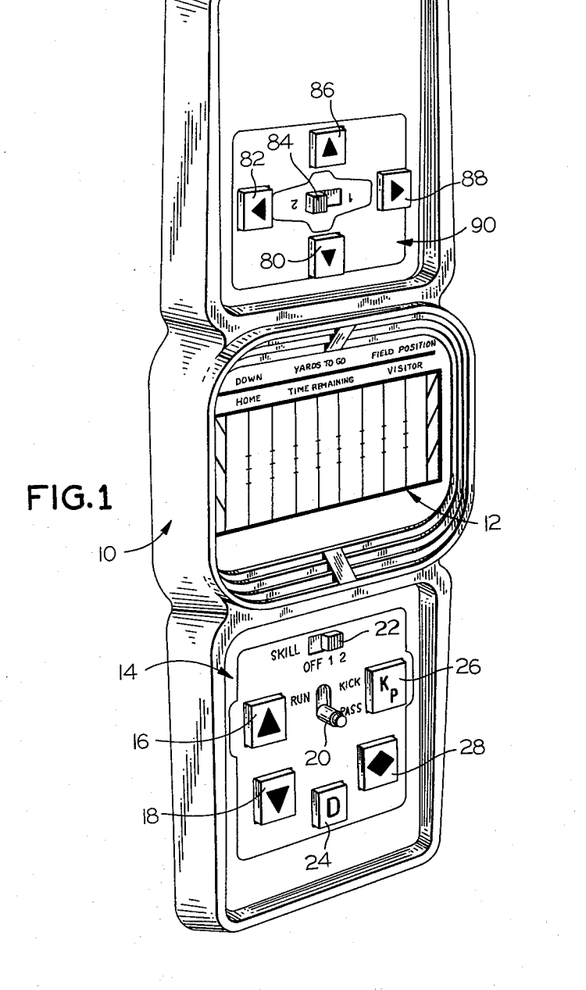
FIG. 1 is a perspective view of the apparatus of the preferred embodiment.

The preferred embodiment of an apparatus for an electronic football game using a multiplicity of offensive players and having a provision for control of a defensive player is illustrated in FIG. 1. It consists of a hand-holdable housing 10 a little larger than a hand-held calculator. A display panel 12 is mounted in the intermediate portion of the housing 10, and offensive and defensive control boards 14 and 90 are provided in the opposite end portions thereof. Display panel 12 includes a matrix of light-emitting diodes beneath a surface on which lines that simulate yard lines on a football field are scribed. During play, the apparatus itself displays a multiplicity of relatively dim symbols representing moving defensive players in a variable manner, that is, in a manner that appears unpredictable to the operator, by successively lighting adjacent segments of an LED display. In one mode there is also a defensive player that is controlled by an operator through operation of directional buttons 80, 82, 86, and 88. Offensive players are symbolized by brighter LEDs, and the symbol for the offensive player denominated the ball carrier flashes on and off. The offensive players are moved in a controlled manner, being directed by the operator from the offensive control board. A switch 20 in the central portion of offensive control board 14 is operated to indicate whether the operator intends to pass, on the one hand, or run or kick on the other. Should he indicate a running play, he can move the ball carrier up or down with the up button 16, which is labeled with an arrow pointing up, or the down button 18, which is labeled with an arrow pointing down. He can also move the ball carrier downfield by operating the downfield button 28, which is labeled with a double-headed horizontal arrow. Pressing the downfield button 28 causes the ball carrier to move left or right, depending on which side has the ball. In the typical game, two people would be playing, the person whose team is on offense being the one operating the offensive controls. When switch 84 located in the center of defensive control board 90 is in the "1" position, all of the defensive players are controlled in a variable manner, but one of the defensive players is controlled by a defensive operator from defensive control board 90 when switch 84 is in the "2" position.

There being a multiplicity of offensive players, operation of directional buttons 16, 18, or 28 during a running play will cause all of the offensive players to move in tandem; that is, the offensive players maintain their positions with respect to each other as they move along the field. This is in contrast to a pass play (indicated by the pass/run switch 20), in which the directional keys 16, 18, and 28 move only the offensive player denominated the receiver; the ball carrier and the remaining offensive players remain stationary. The ball carrier can be moved during a pass play only upon completion of the pass, when the erstwhile receiver becomes the ball carrier.

The remaining manually operable control elements on offensive control board 14 are a three-position switch 22 located at the top of offensive control board 14, a key 24 located at the buttom and labeled "D," and a key 26 whose label reads "K/P." The three-position switch 22 is provided for turning on the unit and indicating which level of skill is desired. The choice of a skill level determines the initial number of defenders and also has other effects detailed below. The "D" key 24 resets the unit after a play and causes status information such as the score and the time remaining to appear on the display panel. Execution of a pass or a kick, depending on the position of switch 20, is effected by operation of the "K/P" key 26.

Not shown in FIG. 1 are openings in housing 10 provided for sound transmission from a sound-generating device located inside the unit. The sound-generating device provides various sounds for purposes such as indication of a tackle, a turnover, or a score.

The operation of the unit is controlled by a microprocessor chip, shown in FIG. 17A, that has been programmed to carry out the functions detailed below and suggested by the diagram of FIG. 2. Instructions can be entered from the control boards, indicated by blocks 45 and 46. An operational circuit, indicated by dashed lines 32, receives signals from the control board 46 and processes them to display action on the display panel 30. The operational circuit 32, which includes the microprocessor, also controls the sound-generating device, indicated by reference numeral 48.

Figure 5:
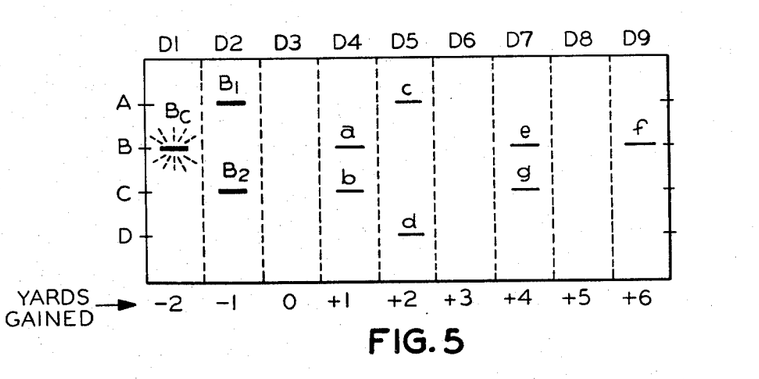
FIGS. 5, 6, and 7 show a simplified version of the display showing the progress of a simulated running play.

The operational-circuit means is programmed to generate and transmit signals to the display panel 30 to produce symbols on the simulated playing field that represent offensive and defensive players. Specifically, offensive players are simulated by brightly illuminated LED segments such as those indicated in FIG. 5 by the references $B_c$, $B_1$, and $B_2$. Player $B_c$ is distinguished by blinking on and off, and this indicates that $B_c$ is the ball carrier. The operational-circuit means also generates signals for placing symbols for defensive players on the display panel. The defensive players are indicated in FIGS. 5 through 16 by the references a, b, c, d, e, f, and g. By appropriate programming, the operational-circuit means is made to include an offensive-player-motion means, indicated by box 34 of FIG. 2, that moves the offensive players according to directions from the control panel 46. When the run/pass switch 20 (FIG. 1) is operated to the "RUN" position, offensive and defensive players are positioned at the beginning of play as indicated in FIG. 5. Defensive player g may or may not be present, depending upon the position of the three-position switch 22; defensive player g is provided when switch 22 is in position 2, but is is not provided when switch 22 is in position 1.

All players remain in their FIG. 5 positions until one of the directional buttons 16, 18, and 28 is pressed. Each operation of one of these directional buttons causes all three offensive players to move one position in the direction indicated by the operated button. Operation of up button 16 or down button 18 can cause one of the blockers $B_1$ or $B_2$ to be moved off the display. Ball carrier $B_c$ cannot be moved off the display, however, and an attempt to do so causes the ball carrier and remaining blocker to remain stationary. If the players start in the positions of FIG. 5, for example, one operation of the up button 16 causes players $B_c$ and $B_2$ both to move up by one position. $B_1$ (which moves off the display) disappears. Further operation of up button 16 causes no movement of the offensive players. If the down button 18 is then operated, offensive player $B_1$ will reappear in its original position, and players $B_c$ and $B_2$ will move back to theirs.

As was just explained, operation of any button once causes movement of the offensive players by one position; if a button is not pushed again, the offensive players remain stationary. This is not true of the defensive players; they begin motion in a variable manner when one of the directional buttons is first operated, and this motion continues regardless of whether further offensive directional buttons are operated. (It is assumed here that switch 84 is in the "1" position; when it is in the "2" position, player f only moves in response to buttons 80, 82, 86, and 88.) This activity of the defensive players is caused by signals from the operational-circuit means 32, which is programmed to include means for moving the defensive players in a variable manner. This function is represented by block 36 of FIG. 2.

The defensive player to be moved is selected in a pseudo-random fashion. Of course, since the microporcessor is a completely determinate machine, the operation cannot be truly random. However, it is well known in the computer art to generate series of pseudo-random numbers. A method for doing so is used by the defensive-motion means 36 to pick the defensive player to be moved. Once a defensive player is picked, a move is "randomly" picked from its repertoire of moves, and the move is executed on the display panel. The defensive-motion means then selects a player for the next move.

Each of the defensive players indicated by references a, b, c, d, and g in FIG. 5 has a repertoire that consists only of forward movements until the player symbol reaches the same "yard line" on which the ball carrier is positioned. They then move up or down towards the ball carrier. Defensive players e and f have a different repertoire, moving up or down toward the ball carrier's row or moving left or right toward the ball carrier's column. For example, if defender e is in column D7 and row A, and if the ball carrier is in row B and column D1, then defender e can either move to the left or down, and the defense-movement means picks one of these movements in a variable manner. (As previously indicated, the term variable manner is used here to denote the apparently random choice of players and moves.)

According to the preferred embodiment of the present invention, the repertoire of a given defensive player depends upon the position of the ball carrier. Referring again to FIG. 5, all defensive players have the same repertoire as players e and f after the ball carrier reaches column D3.

One of the advantages of providing a multiplicity of offensive players is that blocking can be simulated. The operational-circuit means is programmed to provide this function, indicated in FIG. 2 by block 40, by detecting the coincidence on the field of an offensive player and a defensive player. According to the present invention, coincidence of a multiplicity of offensive players, not just of the ball carrier, can be detected independently, and this permits both blocking and tackling to be simulated. The apparatus of the preferred embodiment detects a coincidence between a defensive player and an offensive player other than the ball carrier and suppresses the display of both the offensive player and the defensive player until the end of the play. The end of the play occurs when there is a coincidence between the ball carrier itself and a defensive player. At that point motion stops, display of all players except the ball carrier is suppressed, and the unit must be reset by depressing the "D" button before a new play can be started.

It can be seen that this provision of more than one offensive player adds a new dimension to the game. With one offensive player, of course, no blocking is possible. But a unit that provides a multiplicity of offensive players permits provision to be made for detecting the independent coincidence of a multiplicity of offensive players with a multiplicity of defensive players, so blocking can be provided as well as tackling.

The operational-circuit means is further programmed to include means for monitoring the play action in order to record status information including the number of the down, the field position, the yardage needed for a first down, and the amount of time left in the game. This function is indicated by block 38 of FIG. 2. At the end of a down, the operator depresses the "D" button 24 to reset the unit for the start of the next play. Depressing the "D" button also causes the number of the down, the number of yards to go for first down, and the field position to be indicated on the playing-field portion of the display panel. An example of this is shown in FIG. 3, which shows third down, 13 yards to go on the six-yard line of the offense. The "u-6" means that the ball is at the offense's own six-yard line. Had the display read "d-6", the indication would be that the ball is at the defenders' six-yard line.

Figure 4:
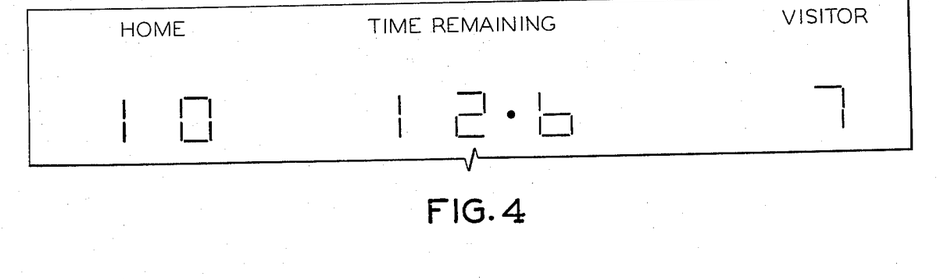
FIG. 4 is a simpler view of the same display showing the score and the amount of time remaining.

A second depression of the "D" button causes a display such as that shown in FIG. 4, in which the score and time remaining are indicated. As shown in FIG. 4, the score is 10 to 7 with 12.6 minutes of play remaining in the quarter. The end of the first quarter is indicated by an automatic display of the score without a depression of the "D" button. The end of a quarter also produces a first-and-ten indication for the visiting team on its own twenty-yard line. The end of the game is indicated by the score and time being displayed automatically and the keyboard being disabled. In order to start a new game, the three-position switch 22 must be operated to OFF and then to position 1 or 2.

In order to execute a pass play, the pass/run switch 20 is operated to the "PASS" position. This puts the circuit into a mode in which it can simulate passes and indicate completions and receptions. The programming for detecting pass completions and receptions is indicated in FIG. 2 by block 42. According to the preferred embodiment, motion of the ball during a pass play is also simulated on the display panel 30, the ball simulation programming being indicated by block 44 of FIG. 2.

Figure 8:
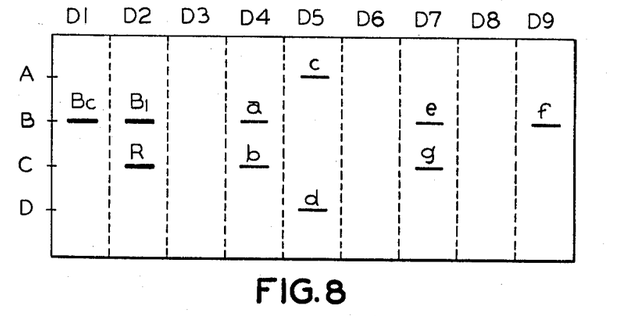
FIGS. 8 through 11 are simplified versions of the display showing the progress of a pass play.

In order to understand the way in which a pass play is displayed on display panel 30, a perusal of FIG. 3 is required. FIG. 3 shows that the display is an array 50 of LED segments. The array has nine columns of segments, and each column includes a standard seven-segment display digit and a decimal point. In addition, each column includes an extra horizontal segment located below the digit. Eighteen terminals 65 are located along the lower edge of the display panel, one for each column and one for each segment per column. In the first column, a standard seven-segment display is shown that is used during display of status information. During play only the horizontal segments are used, but the vertical segments as well as the horizontal segments are employed to convey status information. The extra horizontal segment 60 positioned below the standard display digit 56 is not used to display of status information; it is only used during play-action simulation. The decimal points 64 located to the right of the digits are employed by sequential operation to simulate the flight of a ball during pass plays and kicks. If the run/pass switch is in the "PASS" position, the players are initially lined up as shown in FIG. 8. The offensive player designated R in FIG. 8 is the receiver, player $B_1$ is a blocker, and the ball carrier is designated $B_c$. As in the running play, there is no movement on either side until one of the directional keys is operated. In the pass play, however, operation of a directional key does not cause the ball carrier $B_c$ or blocker $B_1$ to move; only the receiver R moves according to directions from the control board, and it moves independently of the other two offensive players, which remain stationary.

When the receiver executes the first move, the defensive players begin to move, thereby placing the ball carrier in danger of being tackled. Although the blocker $B_1$ of FIG. 8 cannot be moved during a pass play, it can still perform its blocking function; if a defender attempts to reach the ball carrier by going through blocker $B_1$, the defender is taken out of the play, as is blocker $B_1$. The defender taken out of play can no longer be used to tackle the ball carrier, but the ball carrier has lost its blocker, and tackling after the block becomes easier.

The object of the pass play, of course, is to complete a pass to the receiver. The ball is passed by depressing the pass/kick button 26, which causes the decimal points beginning at the position of the ball carrier to be illuminated in succession, thereby simulating the throwing of a pass. In order for the receiver to receive the pass, he must be in row B, the row occupied by the decimal points.

Figure 2:
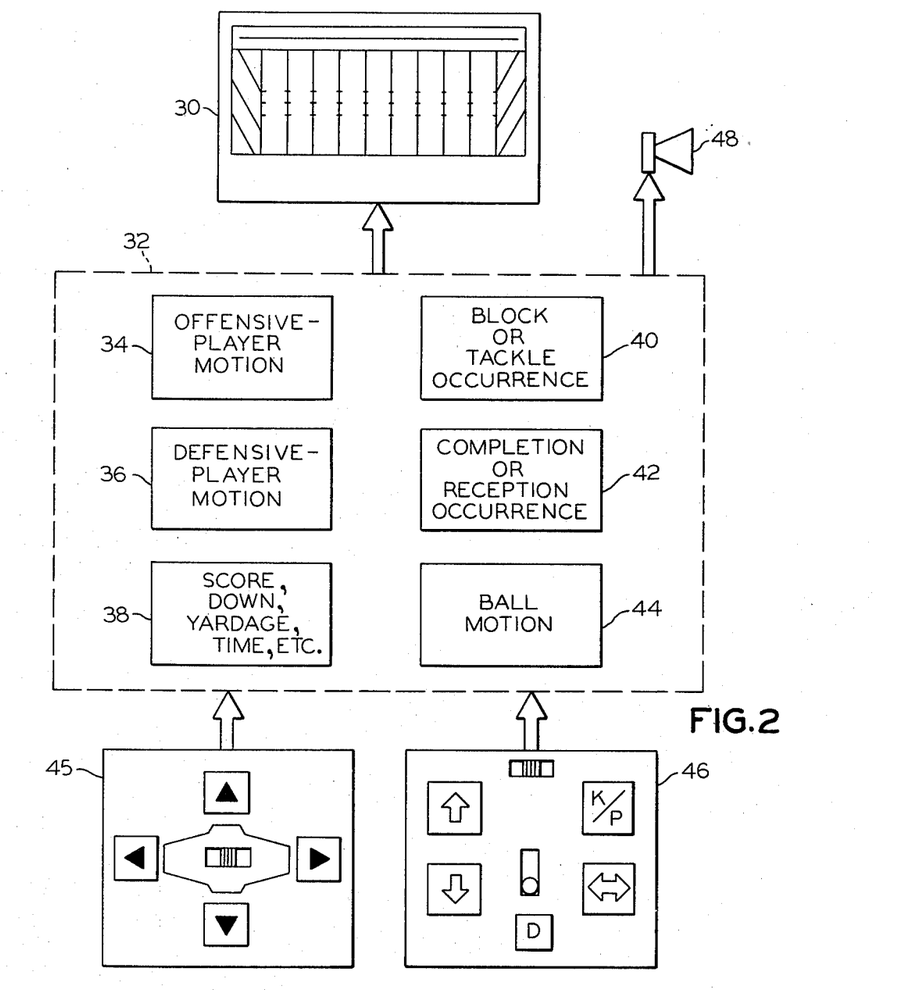
FIG. 2 is a block diagram showing the interdependence between the various functions of the apparatus of the preferred embodiment.
Figure 3:
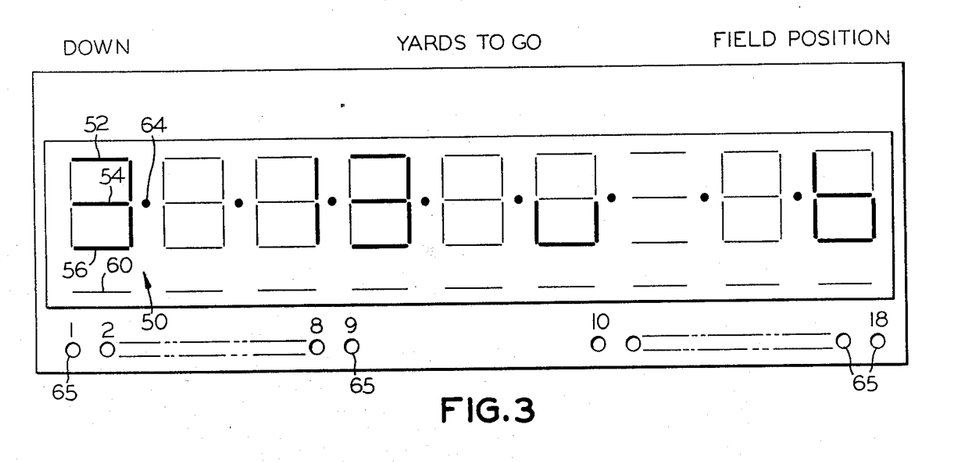
FIG. 3 shows the display panel of the preferred embodiment in detail, the display indicating the down, the yards to go for a first down, and the field position.

As suggested by blocks 42 of FIG. 2, the operational circuit is programmed to simulate the ball motion and to detect the coincidence of the ball and a receiver. When the receiver and the ball coincide, the receiver symbol starts blinking, thereby becoming a ball-carrier symbol. Movement of the new ball carrier is controllable from the control board until play stops as before upon the coincidence of a defensive player and the ball carrier.

In a pass play the repertoires of the four forward defenders a, b, c, and d and the fifth optional defender, g, are the same as they were in the running play, and these defenders still attempt to tackle the ball carrier. Defenders e and f, on the other hand, are pass defenders, and in the pass mode they only move forward in a variable manner until defender e reaches column D5; once defender e reaches column D5, its repertoire and that of defender f change, allowing them only to move up and down in a variable manner.

In addition to their different movement repertoires, defenders e and f also differ from the other defenders in that they have the capability of intercepting a pass. If the ball coincides with any of the other defenders, there is no effect, either on the ball or on the defender; the coincident defender keeps up its variable-manner movement, and the ball continues on its way along row B. However, should the ball coincide with defender e or f, the completion/reception means 42 detects the coincidence, the ball disappears, and a turnover is effected.

At this point, it is to be remembered that the game is typically for use by two operators, one of whom controls the offensive players as they move to the right and the other of whom controls the offensive players as they move to the left. Thus, a turnover is effected by setting the players up on the next play in an orientation opposite to that on the previous play. For instance, assuming that the pass/run switch remains in the pass position, an interception occurring during a pass play that started in the position shown in FIG. 8 would cause the succeeding play to start in an arrangement that is the mirror image of FIG. 8. The ball carrier would start in row B, but in column D9 instead of D1, and the receiver, though starting in row C, would start in column D8 instead of D2. The positions of the other players would be similarly reversed.

The means for presenting and moving the ball, represented by block 44 in FIG. 2, is also used on a kick play. When the run/pass switch is in the "RUN" position, which is also labeled "KICK", the pass/kick key 20 can also be operated, but it has no effect unless the monitoring means 38 has determined that it is a fourth-down play. If it is a fourth-down play, operation of the pass/kick key 26 causes movement of the ball across the display. This movement of the ball simulates a kick, and the kick distance is assigned in a variable manner by the monitoring means 38. If the kick is determined by the monitoring means 38 to have been long enough, the offensive team is credited with a field goal. Otherwise, the position at which the erstwhile defensive side takes over the ball is determined by the yardage assigned to the punt.

It should be emphasized at this point that field position, as recorded by the monitoring means, has no effect on the position at which the line of scrimmage is simulated on the display panel; the ball carrier always starts the play in column D1 or D9, depending on which side has the ball. Thus, the position shown on the display at the end of a play represents only the amount of ground gained on the play, not the field position. The field position is indicated by the numeric characters resulting from operation of the "D" button 24.

Figure 6:
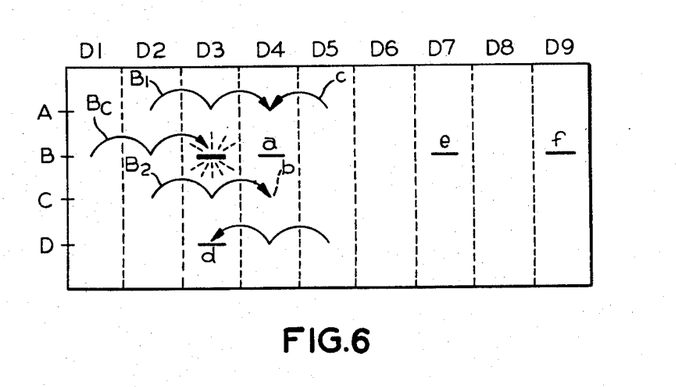
Figure 7:
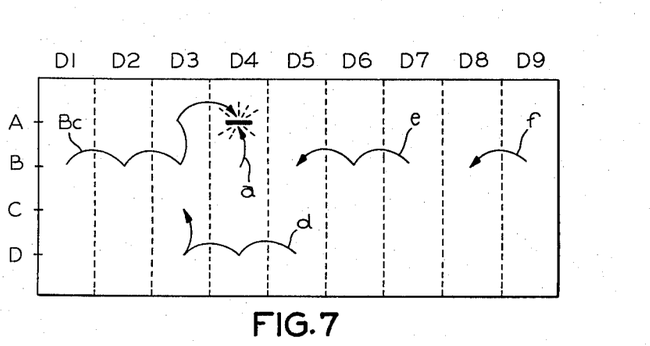

An example of a running play in the one-player mode is shown in FIGS. 5-7. FIG. 5, as indicated previously, gives the normal lineup for a running play when the team advancing to the right has the ball. The ball carrier $B_c$ is in position in column D1 and row B, while blockers $B_1$ and $B_2$ are in column 2, rows A and C, respectively. Defenders a and b are in column D4, rows B and C, respectively, while defenders c and d occupy columns D5, rows A and D, respectively. For purposes of the present illustration, it is assumed that the three-position switch 22 is in position 1, or the lower-skill position, which means that the defender g, which is not shown in FIGS. 6 and 7, is not present on the display. The position it would occupy in the Skill 2 mode is shown in FIG. 5, however, and defenders e and g are shown occupying column D7, rows B and C, respectively. Finally, defender f is located in column D9, row B. FIG. 5 indicates the offensive players by lines that are heavier than those by which it indicates the defensive players. The heavier lines represent the fact that the offensive players are displayed more brightly. The ball carrier $B_c$ is further distinguished to represent the fact that it is blinking.

The players maintain the position shown in FIG. 5 until one of the directional buttons 16, 18, or 28 is depressed. As can be seen by referring to FIG. 6, button 28 is first pressed in the example, causing $B_c$, $B_1$, and $B_2$ all to move forward one space. The pressing of directional button 28 also causes the variable-manner motion of the defenders to start, which is accompanied by a periodic ticking sound emitted by the sound-generating device. The ticks represent the passing of time; they occur approximately once per second in real time, but each represents one-tenth of a minute in simulated time. Up to three defensive moves can occur per tick until the ball carrier reaches column D3.

In addition to the provision of a seventh defensive player, the movement of the three-position switch 22 to position 2 results in a different rate of defensive movement. In both position 1 and position 2, up to three moves can occur per tick when the ball carrier is behind D3 in left-to-right movement or D7 in right-to-left movement. After the ball carrier has advanced beyond that point, however, the rate of defensive play when the switch is in position 2 greatly accelerates, occuring at a rate of up to twelve moves per second. However, iff the three-position switch 22 is in position 1, the rate of defensive play remains at a limit of three moves per second.

As is shown in FIG. 6, three defensive moves occur during the time (in this case) taken by the operator to depress the downfield button 28 twice and move $B_c$, $B_1$, and $B_2$ foreward two spaces. One of the defensive moves is the forward move of defender c. The motion of defender c occurs in a variable manner in the sense that defender c may or may not move, depending on the determination of the defensive-motion means 36. However, once it is determined that defender c will move, its repertoire in the situation shown in FIG. 6 only contains one move, the one shown in FIG. 6. As was mentioned before, defender c can only move along a row until it arrives at the same column as that occupied by the ball carrier $B_c$. It is only when defender c reaches the same column as that of the ball carrier $B_c$ that it can move vertically toward the ball carrier $B_c$.

It is to be noted in FIG. 6 that blocker $B_1$ and defender c are only shown by arrows that point to the same position. This is to indicate that, the blocker and defender having moved to the same position, their coincidence was detected by a conicidence-detection means indicated by reference 40 in FIG. 2, and their display was therefore suppressed. Blocker $B_2$, which also moved in tandem with the ball carrier $B_c$, also encountered a defender, and its display and that of defender b was also suppressed.

Of the remaining defenders, defender d executed two forward moves, the only moves in its repertoire at that point, and defenders e and f were not chosen for movement by the defensive-motion means indicated by reference 36 in FIG. 2.

FIG. 7 shows the next moves executed by the ball carrier in response to commands from the control board. The first command resulted from the depression of the up botton 16, which caused the ball carrier $B_c$ to move from row B to row A in column D3. Before the operator pressed directional button 16, however, defenders e and f moved, e moving forward two spaces and f moving forward one space. Though the repertoires of defensive players e and f include both forward movements toward the column occupied by the ball carrier $B_c$ and up or down movements toward its row, the only choice in the situation presented by FIG. 7 was forward, since at the time of motion both defenders e and f were already in the same row as ball carrier $B_c$.

After the movements of defenders e and f, the ball carrier made its move upward, and this was followed by the movement of defender d. As previously indicated, defender d can only move forward until it reaches the column occupied by the ball carrier. In FIG. 7, however, defender d already occupies the same column as the ball carrier, so the only move open to it is up from row D to row C in column D3 as shown. The move of defender d was followed by a command from the control board resulting from the operation of directional button 28, causing the ball carrier $B_c$ to move forward in row A from column D3 to column D4. At that point, defender a was chosen in a variable manner, and the only move open to it was upward toward the ball carrier. This caused a coincidence between defender a and the ball carrier $B_c$, which was detected by the coincidence-detection means represented by block-or-tackle box 40 of FIG. 2. Play action was accordingly stopped, and display of all players except the ball carrier was suppressed, as seen in FIG. 7. The sound-generating device was operated to simulate a whistle blast, indicating the termination of play action at the position of the ball carrier $B_c$, whose display remained at the end of play action tpo indicate the amount of yardage gained on the play. In FIG. 7 the amount of yardage gain indicated by the position of the ball carrier $B_c$ is one yard. If the ball carrier had been tackled in column D1, a loss of two yards would have resulted. Column D2 indicates a loss of one yard, D3 indicates no yards gained, D5 indicates two yards gained, D6 indicates three yards gained, D7 indicates four yards gained, D8 indicates five yards gained, and D9 indicates six yards gained. This information is stored by the monitoring means indicated by box 38 of FIG. 2, and when the operator presses the "D" button 24, the monitoring means takes this information into consideration in computing the field position that is displayed on the playing-field area of the display. The number of ticks, each of which indicates the passing of a simulated tenth of a minute, is also stored by the monitoring means, which takes this information into account in displaying the amount of time remaining if the operator again presses the "D" button.

Figure 9:
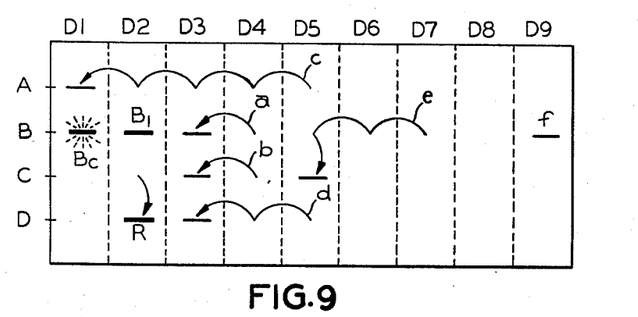

Should the operator switch the pass/run switch to the "PASS" position, the lineup will change to that shown in FIG. 8, in which the ball carrier $B_c$ and blocker $B_1$ occupy row B, columns D1 and D2, respectively. The other offensive player is now called the receiver and occupies row C, column D2. The defensive players occupy the same initial positions that they occupy at the beginning of a running play. The pass play in FIG. 9 is initiated by operation of down button 18, which causes the receiver to move down from row C to row D in column D2. As before, this begins the motion of the defensive players, and in the FIG. 9 example defender d immediately moves forward two spaces. (It is again assumed that the device is in the one-player mode.) The operator attempts to move the receiver forward by operating directional key 28, but the offensive-motion means represented in FIG. 2 by box 34 does not permit the receiver to move onto a space occupied by a defender. As the operator contemplates his next move, defender c moves forward four spaces. As was indicated previously, defender c can only move along a row toward the ball carrier's column at this point, so the picking of defender c for movement necessitates forward moves as shown in FIG. 9. Similar considerations require defender a to move forward when it is picked, and defender b is similarly constrained.

Defender e's pass-play repertoire requires that it move forward (along a row) toward the receiver's row until it reaches column D5. Once it reaches column D5, its repertoire consists of up or down movements along column D5. Defender f is also effected by the position of defender e; its repertoire changes from movement along a row to up or down a column at the same time as defender e's does.

Following the above rules, defender e is picked for three moves, by the first two of which it is placed in column D5. This changes its repertoire to up-or-down movements. It should be emphasized that upon arriving at row B, column D5, defender e has the option of moving up or down because its pass-play repertoire is not restricted to movements toward the receiver once it reaches column D5. Nonetheless, the movement of defender e in FIG. 9 upon arriving at column D5 is shown as being down, toward the row occupied by the receiver.

Figure 10:
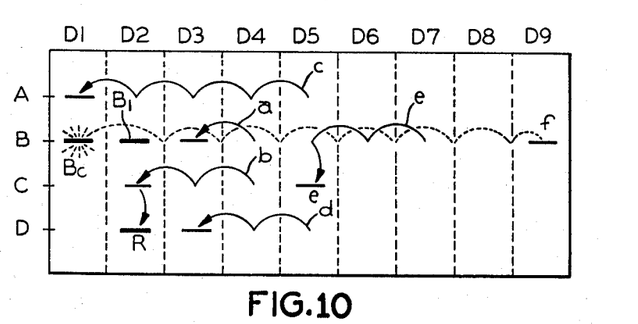

FIG. 10 illustrates the moves that follow those in FIG. 9. The operator, upon realizing that the receiver cannot move forward, decides to press the up botton 16 in order to move the receiver to row B. Before he presses the button, however, defender b is picked twice for movement and executes forward steps, the only movements available in its repertoire at that position. This completely blocks the receiver, leaving the operator with no options for moving the receiver other than to wait until defender b has moved past. However, defender c is dangerously close to the ball carrier $B_c$, and one movement by defender c would result in the ball carrier being tackled, resulting in a loss of two yards.

The operator resolves to throw the ball away, so he presses the pass/kick key. This causes the operational-circuit means 32, which is programmed, as indicated by block 44, to provide a ball display, to place a ball symbol on the display and to move it to the right from the ball-carrier position. As noted above, the ball movement is accomplished by successively lighting adjacent decimal-point segments on the display. On its first movement, the ball coincides with blocker $B_1$. The operational-circuit means is programmed to detect coincidence between the ball and certain players, as is suggested by box 42 of FIG. 2. However, blocker $B_1$ is not one of the players whose coincidence with the ball is to be detected, and the ball continues on its way, unaffected by the presence of blocker $B_1$. The ball also encounters defender a, but defender a also is not one of the players whose coincidence with the ball is to be detected. Coincidence is only to be detected between the ball and either receiver R or one of the pass defenders e or f. The ball thus continues downfield, finally coinciding with defender f. Since defender f is a pass defender, the means indicated by box 42 in FIG. 2 cause an interception to be indicated. Though the players are still shown in FIG. 10, the result of an interception is the suppression of all of the players. Another indication of the interception is a three-whistle blast, simulated by the sound-generating device, which indicates a turnover. After a turnover occurs the offense moves to the left rather than to the right when the players are lined up again, i.e., in the opposite direction.

Figure 11:
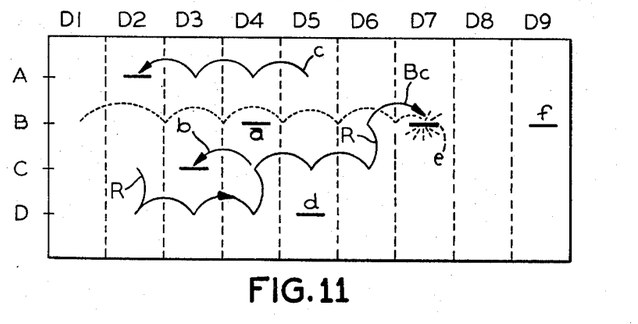
Figure 12:
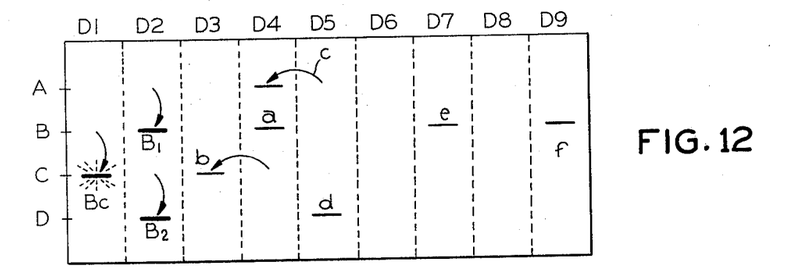
FIGS. 12 through 16 similarly show a play in the two-player mode using both the running and passing features.

FIG. 11 shows a more successful pass play, again assuming the initial position shown in FIG. 8. Action is begun by depressing directional down button 18, which moves the receiver down to row D. The operation of directional key 18 is followed by two successive operations of downfield button 28, which advances the receiver to column D4, row D. Concurrently with these offensive plays, defensive player c executes three forward moves. Again, the repertoire of defensive player c is limited at this point to forward movements toward the ball carrier's column.

Upon reaching row D, column D4, the receiver is boxed in by defenders b and d. However, defender b, which keys on the ball carrier, not the receiver, obligingly moves forward one space, allowing the operator to operate up button 16, which moves the receiver up into row C. The receiver than advances two spaces in row C to column D6, and up button 16 is then operated to move the receiver up into row B. It is necessary for the receiver to be moved into row B because reception of a pass can only be accomplished in row B; row B is the only row with decimal points. The receiver having been maneuvered into row B, the pass/kick button 26 is operated, causing the ball to move forward as was illustrated in FIG. 10. Though the ball carrier $B_c$ and the blocker $B_1$ were both shown in FIG. 1 for clarity, the operational circuit actually suppresses their display after a pass has been thrown. This is indicated in FIG. 11 by the absence of the ball carrier $B_c$ and blocker $B_1$.

As shown in FIG. 11, the ball continues on its journey, encountering defensive player a, which cannot intercept the pass, and continuing until it encounters receiver R. The coincidence between the ball and receiver R is detected, and a reception is indicated by the replacement of the steady receiver signal with the blinking ball-carrier signal. The operator then chooses to press downfield button 28, causing the ball carrier to run right into defensive player e, resulting in a tackle. As is not shown in FIG. 11, all of the players are suppressed except the ball carrier, which remains on the display in column D7, thereby indicating a gain of four yards on the play. Again, the monitoring means records the gain on the play and the number of ticks of the clock that have occurred during play action and employs this information in generating the status displays triggered by pressing the "D" button.

The preceding play illustrations describe the functions provided by the preferred embodiment in the one-player mode. Accordingly to the present invention, a two-player mode is also provided by the device through the operation of switch 84 to the "2" position. In this position, it is possible for defensive player f to be controlled by a second, defensive operator. The two-player mode of the preferred embodiment only has one skill level, but an additional feature is added that was not present in the one-player mode. In the one-player mode, the offensive operator is committed to a pass play once he has operated switch 20 to the PASS position and executed his first play by operation of one of the directional buttons 16, 18, or 28. In the two-player mode, on the other hand, the offensive operator is not so committed, and he can change from a pass play to a running play or vice versa in the middle of a play. If he is in the middle of a pass play, he can change to a running play at any time, but he can only switch from a running play to a pass play if he has not advanced beyond column D4.

An example of a play executed in the two-player mode is illustrated in FIGS. 12 through 16. Again, it is assumed that the players begin with the lineup illustrated in FIG. 5, but with player g absent. The offensive operator begins play by operating down button 18, which moves players $B_c$, $B_1$, and $B_2$ in tandem downwards to the positions illustrated in FIG. 12. Since play has begun, the defensive players begin moving in a variable manner. Defensive player b is selected and moves forward one position to column D3. Defensive player c also is selected and also moves forward one position, according to the repertoire described previously. Defensive players a, d, and e are not selected for movement, and defensive player f, which is only moved in the two-player mode by operation of buttons on defensive control panel 90, has not yet moved because it has not yet received signals from the defensive operator.

Figure 13:
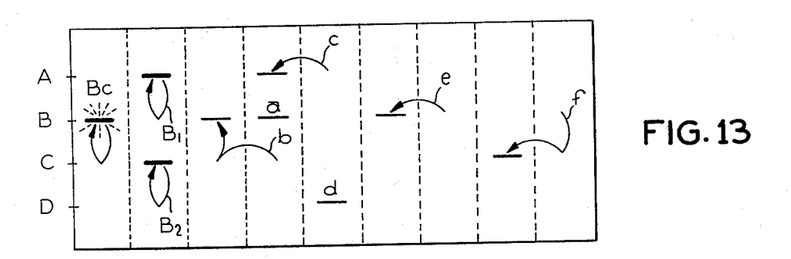

FIG. 13 shows the next moves in the sample play. At this point, the offensive operator has realized that the forward movement of defensive player b has made prospects for advance along row C somewhat unfavorable, so he returns all the offensive players in tandem to their original positions. Defensive player b proves to be rather tenacious and moves up to row B after the ball carrier $B_c$. In the interim, the defensive operator has decided to balance his secondary by moving defensive player f into row C and forward. The pseudo-random operation of the operational circuit has chosen player e for movement also, and it moves forward to the position shown in FIG. 13.

Figure 14:
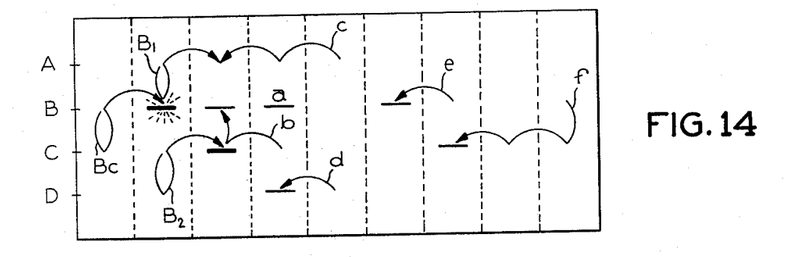
Figure 15:
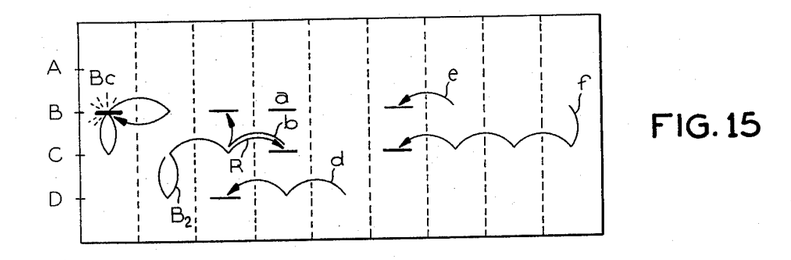

Despite these developments, the offensive operator decides not to double back, as can be seen in FIG. 14. The offensive operator intends to move blocker $B_1$ forward and then downward to take out defensive player b. However, the random selection of defensive players for movement proves unlucky for the offensive operator, and defensive player c moves forward to coincide with $B_1$, so $B_1$ and c are taken out of the play. Meanwhile, defender d has moved forward, and the offensive operator has again depressed button 82 to move defender f forward. As a result, the offensive operator finds his ball carrier $B_c$ facing three defensive players in row B. Accordingly, he switches tactics and decides to throw the ball. He operates switch 20 to the PASS position, and this returns the ball carrier to its original location. $B_2$ does not change position, but it now becomes receiver R. Operation of button 28 by the offensive operator then advances receiver R forward into column D4. Defensive player d has continued its advance during these manipulations, ending up in column D3, and the defensive operator has again operated button 82 to move controllable defensive player f forward.

Figure 16:
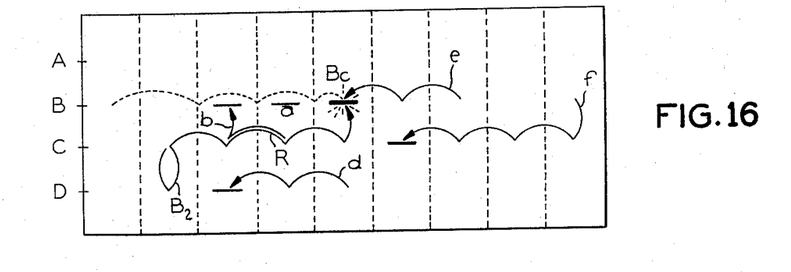

At this point, the defensive operator makes a mistake. Realizing that a pass is about to occur, he operates up button 86 so that he will be in row B, the pass row. However, defender e is in the way, and operation of the button results in no movement of defender f. Since defender f does not move forward, receiver R is able to move forward to column D5 and then up to the pass row, as FIG. 16 shows. Simultaneously, the offensive operator has pressed "K/P" button 26 to initiate a pass, which is simulated in the manner previously described. This results in a completed pass to receiver R, which now becomes the ball carrier and begins blinking. The original ball carrier is accordingly removed from the screen, and there is only one offensive player left. The defensive operator's luck returns at this point, and defensive player e is chosen to move forward. It thereby coincides with the ball carrier, and a tackle is simulated.

Further features are also programmed into the device. One provided in the preferred embodiment is the playing of a simulated fight song upon the occurrence of a score. Another is the provision of variable yardage on kicks. As indicated before, a punt can be simulated on fourth down, and in the preferred embodiment the device assigns a variable distance to the punt, the distance having a nearly Gaussian distribution centered on 35 yards. A punt whose distance exceeds that to the goal line will be scored as a field goal, which is awarded 3 points. However, a punt from 25 yards out does not guarantee that a field goal will result, and the fact that the kick occurs from the 50-yard line does not ensure that the field-goal attempt will be unsuccessful. Thus, the provision of a variable kick distance adds a measure of realism to the game.

Another provision that provides realism is the awarding of a safety when a team loses yardage in its own end zone. Two points are awarded the other team, which receives the ball and a first down on its 20-yard line. In the illustrated embodiment, points after touchdown are not played; seven points are automatically awarded for touchdowns.

Figure 17A:
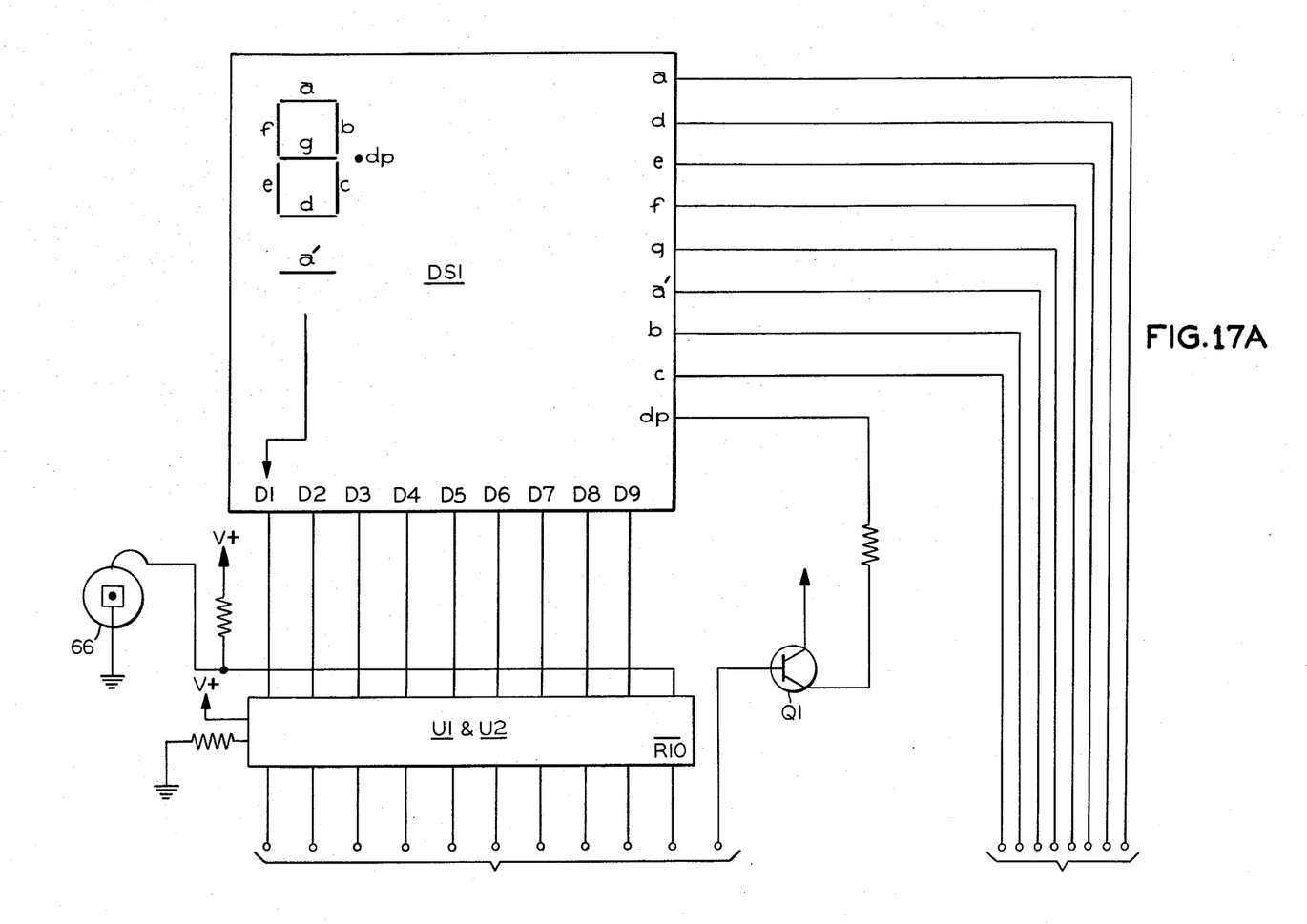
FIGS. 17A and 17B together form a schematic diagram showing a typical circuit for realization of the apparatus of the present invention.
Figure 17B:
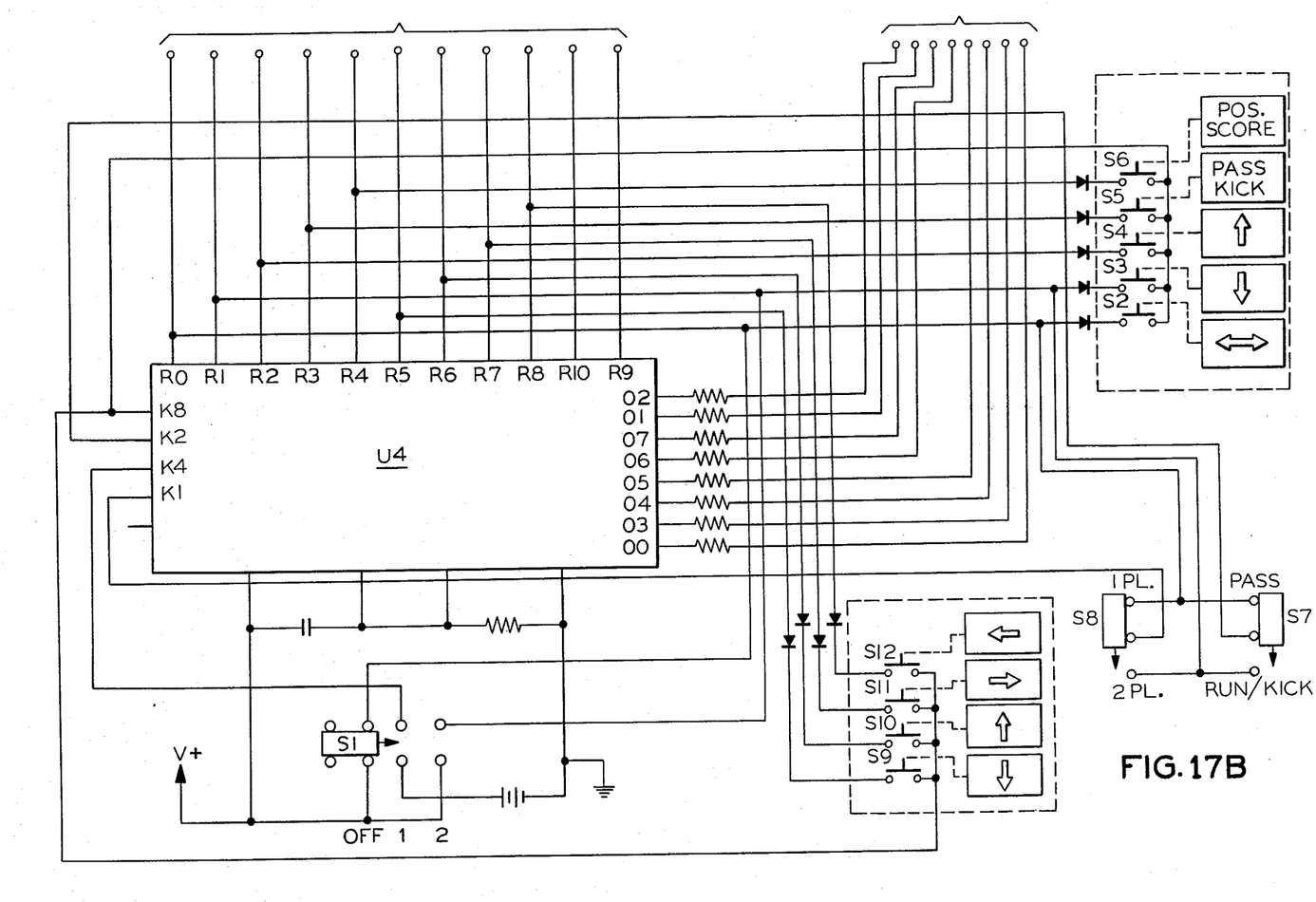

FIGS. 17A and 17B together form a schematic program of one circuit that can be used for realization of the preferred embodiment of the present invention. Bracketed groups of terminals in FIG. 17A represent the same circuit nodes as corresponding terminal groups in FIG. 17B. The elements of the schematic will be described generally; no attempt is made here to describe specifically the signals present on all of the lines in the schematic, because those skilled in the art will understand the operation from the designations of the functional elements.

The heart of the exemplary circuit is a single-chip microprocessor U4, a Texas Instruments TMS 1100, which has been programmed to provide the functions detailed above by mask programming a 2K×4-bit read-only memory. As will be understood by those skilled in the art, the final mask is developed in accordance with the purchaser's specifications.

FIG. 17A includes the LED display DS1. DS1 is a display having the arrangement shown in FIG. 3. The relative locations of the segments are similar to those in commercially available seven-segment displays, but the decimal point is provided level with the g segment instead of the base of the digit. In addition, an extra row of segments a' is provided. The terminals labeled D1 through D9 on DS1 are column-selection terminals. Application of the appropriate voltage level to one of these terminals enables further signals applied at the terminals labeled a through d' to light selected segments in the column. For instance, if it is desired to light segments a and d of the first column in FIG. 3, a signal is applied to terminal D1 of DS1 (FIG. 17A), and the appropriate signals are also applied simultaneously to terminals a and d. The terminals are driven according to signals provided by microprocessor U4 at its terminals labeled R0 through R10 and O0 through O7. The signals from microprocessor U4 that drive the column-selection terminals of the display are applied through driver chips U1 and U2 of FIG. 17A. The driver chips invert the signals applied to them and reduce the loading of the microprocessor outputs at terminals R10 and R0 through R8.

Operation of the segment-selection terminals of DS1 is controlled by means of output signals appearing on terminals R9 and O0 through O7 of U4. Terminal R9 controls the decimal points and is buffered by current amplifier Q1. The remaining segment terminals of DS1 are driven directly from the output terminals O0 through 0.

The other major components of the schematic are the battery BT1, which supplies power to the circuitry, the switches S1 through S7, which also appear in FIG. 1, and a piezoelectric transducer 66, the sound-generating device that provides the various sound indications previously mentioned. As can be deduced from FIGS. 17A and 17B, the piezoelectric transducer 66 is driven by signals R10 from driver chip U1. These signals are applied to the transducer at various frequencies to produce the desired sound signals. The battery, of course, powers the unit, and it is apparent from FIGS. 17A and 17B that the switches can be operated to enter signals into the microprocessor chip U4, it being within the knowledge of those skilled in the art to program the microprocessor to interpret the entered signals.

The remaining discussion explains the method of maintaining a complete roster of players on the LED display DS1 at any given time. As was indicated above, a signal on, say, terminal a of the display DS1 will illuminate the a segments on all of the columns enabled by appropriate signals on terminals D1 through D9 of the display DS1. Thus, it would appear that the appropriate way to light a segments in columns D2, D5, and D7 at the same time would be to apply signals simultaneously to their enabling terminals. However, this would cause a problem if it were also desired to illuminate the d segment of column D1 alone, because a signal on the d terminal would also cause d segments in enabled columns D2, D5, and D7 to light. In order to avoid this result, the display is multiplexed. That is, no two columns are displayed at the same time, but the columns all displayed frequently enough so that their illuminations appear steady and simultaneous. By appropriate timing, this multiplexing effects the differences in brightness between the offensive players and the defensive players; the segments representing defensive players are pulsed less frequently than those that represent offensive players, so the defensive players appear to be dimmer.

It can be appreciated from the play described in FIGS. 12 through 16 that control over a defensive player adds interest to the game both by involving the defensive operator and by providing more play possibilities than are afforded in the one-player mode. The breadth of play possibilities is also enhanced by incorporation of the potential for changing between running and passing in the middle of a play. Accordingly, the two-player mode not only provides a wide variety of play situations but also permits both operators to be active simultaneously, so neither operator is given the opportunity to lose interest due to inaction.

Having thus described the invention, I claim:
1. In an apparatus for simulating a sports action two team game, the combination comprising:

a. a hand-holdable housing having two end portions and an intermediate portion;

b. a display panel on the upper surface of said intermediate portion and including a visual simulation of a playing field and adapted to display symbols in response to electrical signals applied thereto;

c. operational-circuit means in said housing and operatively connected to said display panel for generation and transmission of electrical signals to said display panel to produce symbols on said simulated playing field, said symbols simulating a multiplicity of offensive play symbols and a multiplicity of defensive-player symbols, one of said offensive play symbols at a time simulating the position of a ball, said operational-circuit means including:

(i) means for moving a multiplicity of said offensive play symbols along said playing field;

(ii) means for moving at least ome of said defensive-player symbols along said playing field in a variable manner and at least a controllable one of said defensive player symbols along said playing field in a controlled manner, movement of said offensive play symbols and defensive-player symbols providing play action simulating the action of said sports action team game;

(iii) means for detecting the independent coincidence of a multiplicity of offensive play symbols with a multiplicity of defensive-play symbols and terminating play action upon detection of coincidence of said ball-position symbol with at least a selected one of said defensive-player symbols;

(iv) means for monitoring play action to record information concerning the status of said simulated game and for producing signals indicative of said status information, said signals being transmitted to said display panel to display said status information on said display panel; and d. a multiplicity of manually operable control elements in at least each of said end portions of said housing and providing an offensive control unit in one end portion and a defensive control unit in the opposite end portion thereof, said control elements being connected to said operational-circuit means for transmission of signals to said operational-circuit means through manual operation of said control elements, said offensive-movement means being arranged to produce movement of at least one of said offensive play symbols in response to signals transmitted from said offensive unit control elements, said defensive-movement means being arranged to produce movement of said controllable defensive-player symbol in response to signals transmitted from said defensive unit control elements, said control elements including means for disabling said defensive control unit to permit one player operation of said apparatus combination and said operational circuit means including means for assuming the internal operation of said defensive movement means to effect only variable movement of said defensive-player symbols.

2. The apparatus combination of claim 1 wherein said coincidence-detection means further includes means for suppressing, upon detection of a coincidence between a defensive-player symbol and an offensive play symbol other than said ball position symbol, display of said coincident defensive-player symbol until termination of play action, and means for suppressing, upon coincidence between a defensive-player symbol and an offensive play symbol other than said ball position symbol, display of said coincident offensive play symbol until termination of play action.

3. The apparatus combination of claim 1 wherein said defensive-movement means moves at least some of said defensive-player symbols independently of said controllable one defensive-player symbol according to moves selected from repertoires of possible moves associated with said defensive-player symbols, and wherein said defensive-player symbols movable independently of said controllable one defensive-player symbol are divided into groups, each group having a different repertoire of possible moves.

4. The apparatus combination of claim 1 wherein said means for disabling said defensive control unit comprises selector means movable between one player and two player positions, said two player position rendering the manually operable control elements of the defensive control unit operable to effect controlled movement of at least said controllable one of said defensive-player symbols through operation of said operational circuit means and said one player position disabling said defensive control unit and effecting movement of said defensive-player symbols solely through said internal operation of said defensive movement means.

5. The apparatus combination of claim 1 wherein said control elements include means means for operating said game apparatus in a selected one of at least two play action modes, a. one of said modes being a "rushing" mode in which said control board and control means interact to simulate "running" action of the ball-position symbol, one of said manually operable control elements transmitting signals to said control means which includes means operating upon said offensive play symbol movement means to effect concurrent movement of the ball-position symbol and at least one other offensive play symbol generally in a common direction along the playing field as the one player manually operates the offensive control unit to effect movement of the ball-position symbol through the defensive-player symbols, said detecting means limiting the movement of said defensive-player symbols towards the ball-position symbol upon detection of coincidence thereof with said other concurrently moving offensive play symbols to simulate "blocking" thereof by said other concurrently moving offensive play symbols, said detecting means terminating play action upon detection of coincidence of a defensive-player symbol with said ball-position symbol, at least one of said defensive unit control elements transmitting signals to said defensive-movement means to maneuver the manually controllable defensive-player symbol to "tackle" the ball-position symbol as the other player manually operates the defensive unit control elements; and b. another mode being a "passing" mode in which said control board and control means interact to simulate the "passing" of the ball-position symbol to a maneuverable "receiver", at least one of said manually operable control elements transmitting signals to said operational-circuit means which includes means operating upon said offensive play symbol movement means to effect movement of an offensive play symbol representing an intended "receiver", the operator manually operating the control elements to move the "receiver" symbol and ball-position symbol into an aligned position to execute a pass, said detection means precluding movement of the "receiver" symbol to a position occupied by a defensive-player symbol, said operational-circuit means also including means operating upon said offensive play symbol movement means to effect advance of said ball-position symbol along a linear path upon actuation of a manually operable control element, said operational-circuit means including means for detecting coincidence of the advancing ball-position symbol and "receiver" symbol to represent a completed "pass", said operational-circuit means including means for detecting coincidence of the advancing ball position symbol and at least a selected one of said defensive-player symbols to represent an "intercepted pass", and at least one of said defensive unit control elements transmitting signals to said defensive movement means to maneuver the manually controllable defensive-player symbol to intercept the "pass" or to tackle the "receiver" symbol.

6. The apparatus combination of claim 5 wherein said operational-circuit means further includes means for detecting coincidence between said ball-position symbol and said controllable defensive-player symbol, thereby detecting a simulated interception, and for indicating said interception.

7. The apparatus combination of claim 5 wherein said defensive-movement means moves each of the others of said defensive-player symbols independently of said controllable one defensive-player symbol according to moves selected from a repertoire of possible moves, and wherein said other defensive-player symbols movable independently of said controllable one defensive-player symbol are divided into at least two groups in each of said modes of play, each group having a different repertoire of possible moves, one group in said passing mode concentrating on the "receiver" symbol and another group in said passing mode advancing on the ball-position symbol, one group in said "running" mode remaining behind the initial line between the teams and another group advancing on the ball-position symbol.

8. In a method of playing a simulated sports-action two team game, the steps of:
   a. providing a hand-holdable housing having two end portions and an intermediate portion with a display panel in said intermediate portion that includes a visual simulation of a playing field and is adapted to display symbols in response to electrical signals applied to it, said housing including operational circuit means therewithin, and a multiplicity of manually operable control elements in at least each of said end portions of said housing, said manually operable control elements being operable by a pair of players competing with each other;
   b. manipulating said manually operable control elements in one end portion to effect operation of said operational circuit means to generate electrical signals and transmit them to said display panel to produce a multiplicity of offensive play symbols on said display panel, one of said offensive play symbols at a time simulating the position of a ball, and to move a multiplicity of said offensive play symbols in a controlled manner along said simulated playing field;
   c. manipulating said manually operable control elements in the other of said end portions to generate and transmit electrical signals to said display panel to produce a multiplicity of defensive-player symbols on said display panel and to move at least some of said defensive-player symbols along said simulated playing field, said manipulation effecting the movement of at least a controlled one of said defensive-player symbols in a controlled manner along said simulated playing field;
   d. detecting the independent coincidence of a multiplicity of offensive play symbols with a multiplicity of defensive-player symbols and terminating play action upon detection of coincidence between said ball-position symbol and at least a selected one of a multiplicity of said defensive-player symbols; and
   e. monitoring play action to record information concerning the status of said simulated game.

9. The method of claim 8 wherein said step of manipulating said manually operable control elements to move said offensive player symbols includes moving at least one of said offensive play symbols, denominated a receiver symbol, independently of said ball-position symbol, and further including the steps of:
   manipulating one of said manually operable control elements to generate and transmit electrical signals to said display panel to produce a ball symbol on said display panel and to move said ball symbol along said simulated playing field from said ball-position symbol towards said receiver symbol, thereby simulating a pass; and
   detecting coincidence between said ball symbol and said receiver symbol, thereby detecting the occurrence of a simulated pass completion.

10. The method of claim 9 further including the steps of:
   a. detecting coincidence between said ball symbol and said controllable defensive-player symbol, thereby detecting a simulated interception; and
   b. indicating said interception.

11. The method of claim 9 further including the step of operating one of said manually operable control elements to disable the said manually operable defensive-player control elements to permit one player operation of said game and to activate means for assuming the internal operation of the movement of said defensive-player symbols to effect only variable movement of said defensive-player symbols.

* * * * *

UNITED STATES PATENT AND TRADEMARK OFFICE
CERTIFICATE OF CORRECTION

PATENT NO. : 4,249,734
DATED : February 10, 1981
INVENTOR(S) : Eric Bromley

It is certified that error appears in the above-identified patent and that said Letters Patent are hereby corrected as shown below:

Column 1, line 26, "a," should be -- a -- (remove comma)

Column 1, line 35, "simulate to" should be -- simulate a --

COlumn 2, line 12, "sumbol" should by -- symbol --

Column 3, line 2, "means" should be -- moves --

Column 3, line 17, "a," should be -- a -- (remove comma)

Column 6, line 3 "is is" should be -- is --

Column 6, lines 39-40, "microporcessor" should be
    -- mincroprocessor --

Column 8, line 19, after "display" delete "of"

Column 9, line 11 "reception" should be -- interception --

Column 10, line 32 "iff" should be -- if --

Column 13, line 10, "inital" should be -- initial --

Column 15, lines 34-35 "program" should be -- diagram --

Column 15, line 68, " provided" should be -- produced --

Column 16, line 46, before "all" insert -- are --

Column 17, line 18, "ome" should be -- some --

Column 17, line 28, "-play" should be -- -player --

UNITED STATES PATENT AND TRADEMARK OFFICE
CERTIFICATE OF CORRECTION

PATENT NO. : 4,249,734

DATED : February 10, 1981

INVENTOR(S) : Eric Bromley

It is certified that error appears in the above-identified patent and that said Letters Patent are hereby corrected as shown below:

Column 18, line 27, "means means" should be -- means --

Signed and Sealed this

Twenty-first Day of July 1981

[SEAL]

Attest:

GERALD J. MOSSINGHOFF

Attesting Officer

Commissioner of Patents and Trademarks